(12) United States Patent
Degwekar et al.

(10) Patent No.: US 11,467,778 B2
(45) Date of Patent: Oct. 11, 2022

(54) CREATING HIGH AVAILABILITY STORAGE VOLUMES FOR SOFTWARE CONTAINERS

(71) Applicant: EMC IP Holding Company LLC, Hopkinton, MA (US)

(72) Inventors: Anil Arun Degwekar, Bangalore (IN); Utkarsh Dubey, Lucknow (IN); Prasant Kumar Padhi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/151,325

(22) Filed: Jan. 18, 2021

(65) Prior Publication Data
US 2022/0229605 A1    Jul. 21, 2022

(51) Int. Cl.
*G06F 3/06* (2006.01)

(52) U.S. Cl.
CPC .......... *G06F 3/0665* (2013.01); *G06F 3/0604* (2013.01); *G06F 3/065* (2013.01); *G06F 3/067* (2013.01); *G06F 3/0629* (2013.01)

(58) Field of Classification Search
CPC .... G06F 3/0665; G06F 3/0604; G06F 3/0629; G06F 3/065; G06F 3/067
See application file for complete search history.

(56) References Cited

U.S. PATENT DOCUMENTS

| | | | | |
|---|---|---|---|---|
| 6,757,695 | B1 * | 6/2004 | Noveck | G06F 11/2033 |
| 10,969,985 | B1 * | 4/2021 | Matsugami | G06F 3/0635 |
| 11,106,371 | B1 * | 8/2021 | Tsuchiya | G06F 3/0659 |
| 2005/0193023 | A1 * | 9/2005 | Ismail | G06F 3/0604 348/E7.063 |
| 2017/0220275 | A1 * | 8/2017 | Anzai | G06F 3/065 |
| 2017/0286019 | A1 * | 10/2017 | Takahashi | G06F 3/06 |
| 2017/0300233 | A1 * | 10/2017 | Sato | G06F 3/065 |
| 2018/0020077 | A1 * | 1/2018 | Folco | G06F 9/50 |

(Continued)

OTHER PUBLICATIONS

Dell EMC, "Using SRDF/Metro in a WMware Metro Storage Cluster Running Oracle E-Business Suite and 12C RAC," White Paper, Nov. 2016, 102 pages.

(Continued)

*Primary Examiner* — Nanci N Wong
(74) *Attorney, Agent, or Firm* — Ryan, Mason & Lewis, LLP (57) ABSTRACT

An apparatus comprises a processing device configured to receive a create volume request to create a given storage volume for a software container instance running on a container host device, to parse the given request to identify replication-related parameters for the given storage volume, the identified replication-related parameters comprising an availability parameter. The processing device is also configured, responsive to the availability parameter specifying that the given storage volume should be configured with enhanced availability, to create a first logical storage volume on a first storage array and a second logical storage volume on a second storage array, to establish a replication link between the first logical storage volume on the first storage array and the second logical storage volume on the second storage array, and to mount the first and second logical storage volumes to a designated volume mount point in the software container instance.

20 Claims, 7 Drawing Sheets

(56) References Cited

U.S. PATENT DOCUMENTS

2018/0210665 A1* 7/2018 Anumula .............. G06F 3/0665
2018/0267713 A1* 9/2018 Saito ..................... G06F 3/0644
2021/0271565 A1* 9/2021 Bhavanarushi ......... G06F 9/455

OTHER PUBLICATIONS

Dell Technologies, "Dell EMC PowerMax and VMAX All Flash: SRDF/Metro Overview and Best Practices," Sep. 2020, 120 pages.
Dell EMC, "Dell EMC Unisphere for PowerMax Product Guide," Version 9.1.0, Sep. 2019, 50 pages.
Dell EMC, "Dell EMC SRDF," Introduction, Rev 01, Sep. 2019, 108 pages.
Go Programming Language, "Documentation," https://golang.org/doc/, Accessed Dec. 29, 2020, 4 pages.

* cited by examiner

CREATING HIGH AVAILABILITY STORAGE VOLUMES FOR SOFTWARE CONTAINERS

FIELD

The field relates generally to information processing, and more particularly to storage in information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems.

SUMMARY

Illustrative embodiments of the present disclosure provide techniques for creating high availability storage volumes for software containers.

In one embodiment, an apparatus comprises at least one processing device comprising a processor coupled to a memory. The at least one processing device is configured to perform the steps of receiving a create volume request to create a given storage volume for a software container instance running on a container host device and parsing the given request to identify one or more replication-related parameters for the given storage volume, the identified one or more replication-related parameters comprising an availability parameter specifying whether the given storage volume should be configured with enhanced availability. The at least one processing device is also configured to perform the steps of, responsive to the availability parameter specifying that the given storage volume should be configured with enhanced availability, creating a first logical storage volume on a first storage array and at least a second logical storage volume on a second storage array, establishing a replication link between the first logical storage volume on the first storage array and the second logical storage volume on the second storage array, and mounting the first logical storage volume and the second logical storage volume to a designated volume mount point in the software container instance.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
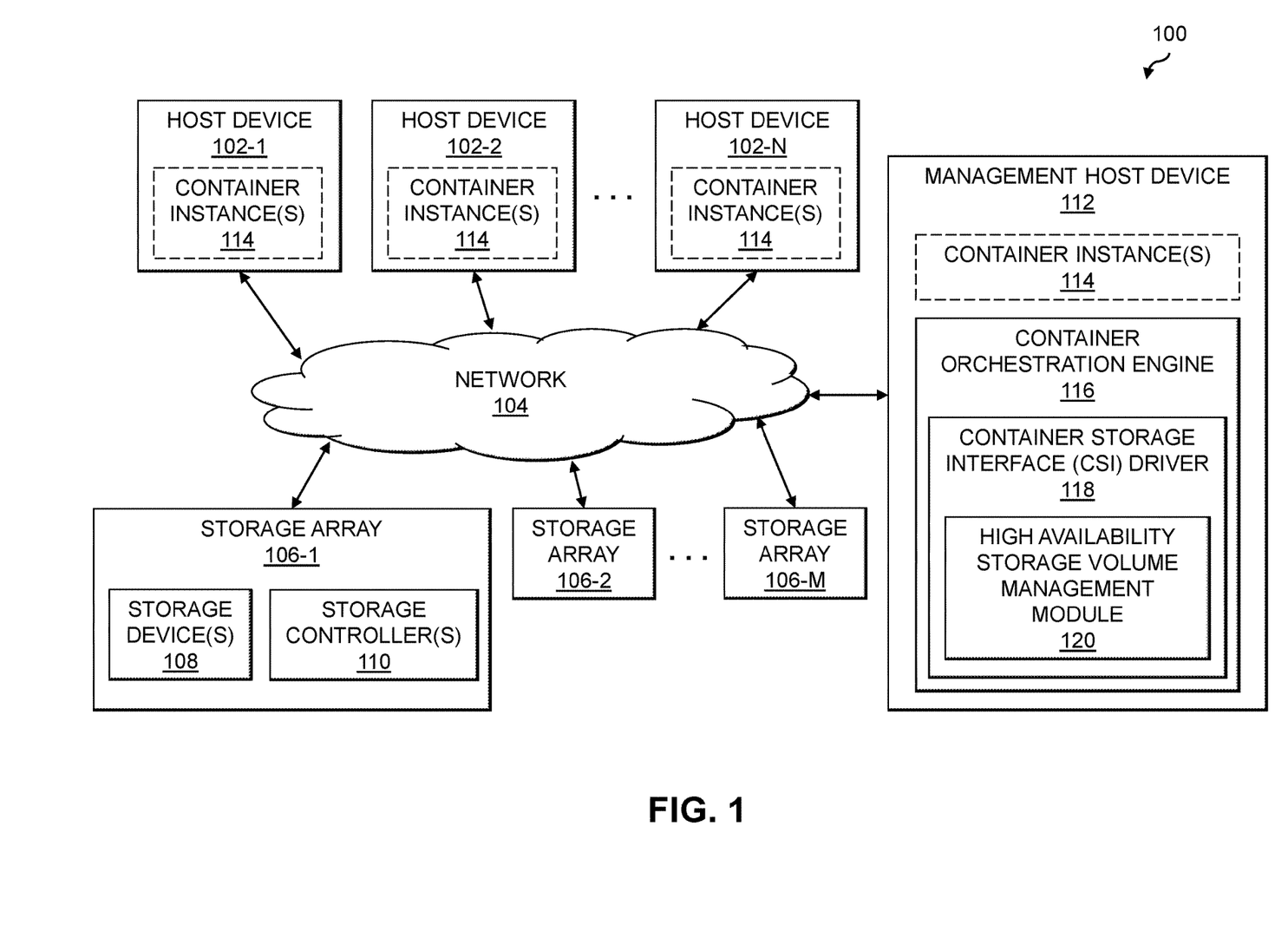
FIG. 1 is a block diagram of an information processing system for creating high availability storage volumes for software containers in an illustrative embodiment.

FIG. 1 shows an information processing system 100 configured in accordance with an illustrative embodiment to create high availability storage volumes for software containers. The information processing system 100 comprises one or more host devices 102-1, 102-2, . . . 102-N (collectively, host devices 102) and a management host device 112 that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102 and the management host device 112. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102 and the management host device 112, and is therefore also referred to herein as a "shared storage system." In embodiments where there is only a single host device 102, the host device 102 may be configured to have exclusive use of the storage system.

The host devices 102 and management host device 112 illustratively comprise respective computers, servers or other types of processing devices capable of communicating with the storage arrays 106 via the network 104. For example, at least a subset of the host devices 102 and the management host device 112 may be implemented as respective virtual machines of a compute services platform or other type of processing platform. The host devices 102 and the management host device 112 in such an arrangement illustratively provide compute services such as execution of one or more applications on behalf of each of one or more users associated with respective ones of the host devices 102 and the management host device 112.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102 and the management host device 112. These objects can comprise files, blocks or other types of objects. The host devices 102 and the management host device 112 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an 10 operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

In the information processing system 100 of FIG. 1, software container instances 114 running on the host devices 102 and the management host devices 112 are assumed to access one or more storage volumes provided by the storage arrays 106. The host devices 102 and the management host device 112 may also be referred to as container host devices or nodes of a container environment. In the FIG. 1 embodiment, the management host device 112 or management node of the container environment implements a container orchestration engine 116. One or more of the software container instances 114 may run on the management host device 112. The host devices 102 and/or management host device 112 utilize the software container instances 114, which have storage volumes mounted therein where the underlying storage for such storage volumes is provided by the storage arrays 106.

In some embodiments, a storage volume mounted in a given one of the software container instances 114 is configured as a "high availability" storage volume using storage class information that configures the storage volume using remote replication functionality preconfigured on two or more of the storage arrays 106. For example, a high availability storage volume in the given software container instance 114 may have a "local" storage volume in a first "local" one of the storage arrays (e.g., storage array 106-1) and a "remote" storage volume in a second "remote" one of the storage arrays (e.g., storage array 106-2). Such "local" and "remote" storage volumes may run in an active-active configuration using remote replication functionality as described in further detail elsewhere herein.

As noted above, the management host device 112 further includes a container orchestration engine 116, also referred to as a container orchestrator, which implements a container storage interface (CSI) driver 118 for performing various operations on storage volumes inside of container instances 114 (which may run on the host devices 102 and/or the management host device 112, and are managed by the container orchestration engine 116). The container orchestration engine 116, for example, may communicate with plugins using CSI Remote Procedure Calls (RPCs). A storage volume for a given software container instance 114, also referred to as simply a volume, is a unit of storage that is made available inside the given software container instance 114 managed by the container orchestration engine 116 using the CSI driver 118.

The CSI driver 118 may communicate with the storage arrays 106 through a management platform (e.g., such as Unisphere) and associated representational state transfer (REST) application programming interfaces (APIs). In some embodiments, the storage arrays 106 are assumed to implement Remote Data Facility (RDF) functionality, such as Symmetrix® RDF (SRDF) or SRDF/Metro functionality. For an SRDF/Metro implementation, the first "local" storage array (e.g., storage array 106-1) is also referred to as the R1 storage array (e.g., the local array taking part in an SRDF/Metro replication relation) and the second "remote" storage array (e.g., storage array 106-2) is also referred to as the R2 storage array (e.g., the remote array taking part in the SRDF/Metro replication relation).

The CSI driver 118 implements a high availability storage volume management module 120, which provides functionality for creating, publishing and staging storage volumes in the software container instances 114 to take advantage of remote replication functionality of the storage arrays 106 to thereby provide high availability storage for the software container instances 114.

At least portions of the functionality of the container orchestration engine 116, CSI driver 118 and high availability storage volume management module 120 may be implemented at least in part in the form of software that is stored in memory and executed by a processor.

Although shown as being implemented internal to the management host device 112 in the FIG. 1 embodiment, it should be appreciated that the container orchestration engine 116 may also or alternatively be implemented at least in part internal to one or more of the host devices 102 and/or one or more of the storage arrays 106 (e.g., such as on the storage controllers 110 of storage array 106-1). For example, the container orchestration engine 116 may be distributed across the nodes or host devices 102 of a container environment, rather than being run on one "master" node or management host device 112 of the container environment. Storage controllers of one or more of the storage arrays 106 (e.g., storage controllers 110 of storage array 106-1), as another example, may at least partially implement one or more of the container orchestration engine 116, the CSI driver 118 and the high availability storage volume management module 120.

The host devices 102, management host device 112 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources.

For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the management host device 112 (or one or more components thereof such as the container orchestration engine 116, CSI driver 118 and/or high availability storage volume management module 120) and the storage arrays 106 may be implemented on respective distinct processing platforms, although numerous other arrangements are possible. For example, in some embodiments at least portions of one or more of the host devices 102, the management host device 112 and the storage arrays 106 are implemented on the same processing platform. The management host device 112, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 and the management host device 112 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102, the management host devices 112 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random-access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 and the management host device 112 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the management host device 112 may be implemented at least in part in the first geographic location, the second geographic location, and one or more other geographic locations. Thus, it is possible in some implementations of the system 100 for different ones of the host devices 102, the management host device 112, and the storage arrays 106 to reside in different data centers.

Numerous other distributed implementations of the host devices 102, the management host device 112, and the storage array 106 are possible. Accordingly, the host devices 102, the management host device 112, and the storage array 106 can also be implemented in a distributed manner across multiple data centers.

Additional examples of processing platforms utilized to implement portions of the system 100 in illustrative embodiments will be described in more detail below in conjunction with FIGS. 5 and 6.

It is to be understood that the particular set of elements shown in FIG. 1 for creating high availability storage volumes for software containers is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for creating high availability storage volumes for software containers will now be described in more detail with reference to the flow diagram of FIG. 2. It is to be understood that this particular process is only an example, and that additional or alternative processes for creating high availability storage volumes for software containers may be used in other embodiments.

In this embodiment, the process includes steps 200 through 208. These steps are assumed to be performed by the container orchestration engine 116 utilizing the CSI driver 118 and high availability storage volume management module 120. The process begins with step 200, receiving a create volume request to create a given storage volume for a software container instance (e.g., one of container instances 114) running on a container host device (e.g., one of the host devices 102 or the management host device 112). In step 202, the given request is parsed to identify one or more replication-related parameters for the given storage volume, the identified one or more replication-related parameters comprising an availability parameter specifying whether the given storage volume should be configured with enhanced availability. The one or more replication-related parameters may be included in a storage class specified in the create volume request, the storage class specifying a set of attributes that determine a class of service for the given storage volume. The one or more replication-related parameters may further comprise a replication group number, the replication group number identifying a first set of ports on a first storage array (e.g., storage array 106-1) and a second set of ports on a second storage array (e.g., storage array 106-1) to be used for establishing a replication link between a first logical storage volume on the first storage array and a second logical storage volume on the second storage array (e.g., in step 206). The one or more replication-related parameters may further comprise an array identifier of the second storage array.

Responsive to the availability parameter specifying that the given storage volume should be configured with enhanced availability, a first logical storage volume is created on a first storage array and at least a second logical storage volume is created on a second storage array in step 204. In step 206, a replication link is established between the first logical storage volume on the first storage array and the second logical storage volume on the second storage array. The first logical storage volume and the second logical storage volume are mounted to a designated volume mount point in the software container instance in step 208.

Figure 2:
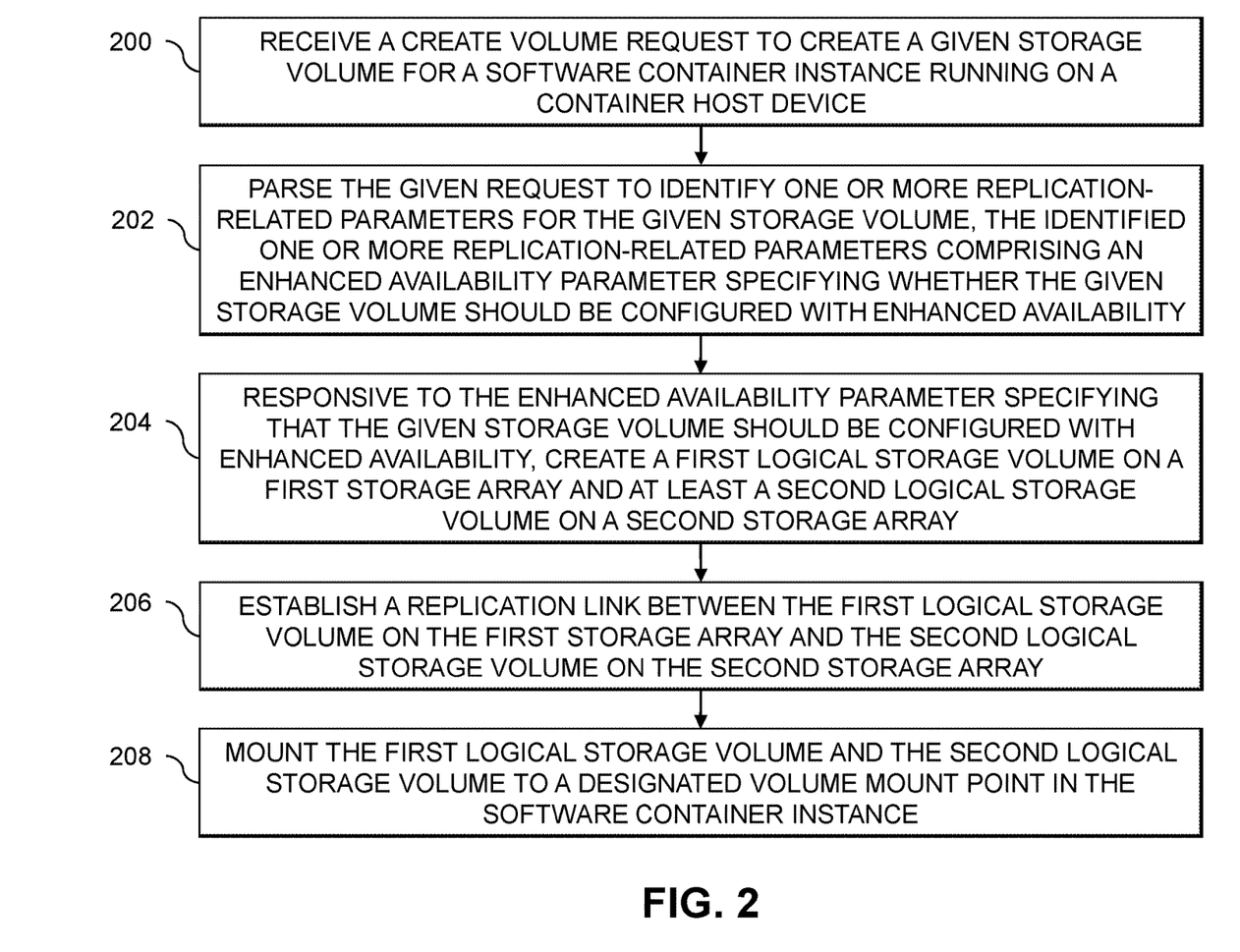
FIG. 2 is a flow diagram of an exemplary process for creating high availability storage volumes for software containers in an illustrative embodiment.

In some embodiments, the FIG. 2 process further includes returning a volume context for the given storage volume, the volume context comprising a first logical storage volume identifier for the first logical storage volume, a second logical storage volume identifier for the second logical storage volume, a storage group name and the array identifier of the second storage array. Step 208 may comprise receiving, responsive to the software container instance being scheduled on the container host device having the designated volume mount point specifying the given storage volume, a controller publish request comprising the volume context for the given storage volume, adding the first logical storage volume and the second logical storage volume identified in the volume context to a masking view of the container host device on the first storage array and the second storage array, and generating a publish context for the given storage volume, the publish context comprising logical unit addresses and port identifiers for the first logical storage volume on the first storage array and the second logical storage volume on the second storage array.

Step 208 may also or alternatively include receiving, responsive to the software container instance requesting to utilize the given storage volume on the container host device, a node stage volume request comprising a publish context for the given storage volume and a staging path for the container host device, adding the first logical storage volume on the first storage array and the second logical storage volume on the second storage array to the staging path, and utilizing logical unit address and port identifier information in the publish context to connect the container host device to the first logical storage volume on the first storage array and the second logical storage volume on the second storage array. Step 208 may further or alternatively include receiving, responsive to the software container instance requesting to utilize the given storage volume on the container host device, a node publish volume request comprising a target path for the given storage volume, publishing the first logical storage volume and the second logical storage volume to the target path, and utilizing input-output multipathing on the container host device to configure (i) one or more first input-output paths from the software container instance on the container host device to the first logical storage volume on the first storage array and (ii) one or more second input-output paths from the software container instance on the container host device to the second logical storage volume on the second storage array.

In some embodiments, the FIG. 2 process further includes unmounting the first logical storage volume and the second logical storage volume from the designated volume mount point in the software container instance. Unmounting the first logical storage volume and the second logical storage volume from the designated volume mount point in the software container instance may comprise receiving, responsive to determining that at least one of usage of the given storage volume on the container host device is completed and that the software container instance is to be moved to another container host device, a node unpublish volume request specifying the given storage volume and a target path for the given storage volume and unmounting the first logical storage volume and the second logical storage volume from the target path for the given storage volume on the container host device. Unmounting the first logical storage volume and the second logical storage volume from the designated volume mount point in the software container instance may also or alternatively comprise receiving, responsive to unmounting the first logical storage volume and the second logical storage volume from a target path for the given storage volume on the container host device, a node unstage volume request specifying the given storage volume and a staging path on the container host device, removing one or more files and directories in the staging path, and disconnecting the container host device from the first logical storage volume on the first storage array and the second logical storage volume on the second storage array.

Unmounting the first logical storage volume and the second logical storage volume from the designated volume mount point in the software container instance may further or alternatively comprise receiving, responsive to unmounting the first logical storage volume and the second logical storage volume from a target path for the given storage volume on the container host device and disconnecting the container host device from the given storage volume, a controller unpublish volume request specifying the given storage volume and the container host device and removing the first logical storage volume and the second logical storage volume from a masking view of the container host device on the first storage array and the second storage array. Unmounting the first logical storage volume and the second logical storage volume from the designated volume mount point in the software container instance may further or alternatively comprise receiving a request to delete the given storage volume, performing a suspend action for a replication group associated with the given storage volume, deleting a replica pair in the replication group, the replica pair comprising the first logical storage volume and the second logical storage volume, performing a resume action for the replication group, and deleting the first logical storage volume from the first storage array and the second logical storage volume from the second storage array.

In some container environments, such as in a Kubernetes Environment, CSI drivers are used to provision persistent volumes for containers, or groups of containers (e.g., pods) on storage arrays. Many traditional applications are now being migrated to containers. A cloud-native application typically assumes that the underlying infrastructure is prone to failure, and therefore handles this through various techniques such as load balancing, monitoring whether containers are alive, and spawning new containers when a container or its underlying node and/or storage is no longer alive. When a legacy application is not written with these possibilities in mind and is being migrated to one or more containers, the container infrastructure needs to provide high availability.

Illustrative embodiments provide high availability of storage to containers in a container environment (e.g., a Kubernetes environment). In some embodiments, such high availability is provided through storage arrays with replication support. For example, a Dell EMC PowerMax storage array may provide high availability of storage to containers using a Symmetrix® Remote Data Facility (SRDF)/Metro configuration. SRDF/Metro provides various features for disaster recovery and data mobility solutions. SRDF/Metro has been applied to bare metal and VMware environments, but not in container environments.

More particularly, some embodiments utilize storage arrays in an active-active configuration with SRDF/Metro, which facilitates replication of data from one storage array to another through a SAN or an IP network, although a wide variety of other active-active configurations involving different types of storage arrays can be used. In such a configuration, logical devices may be non-SRDF/local devices or SRDF/metro devices. A non-SRDF/local device is local to the first storage array and has no paired logical device on the second storage array, while an SRDF/metro device has a paired logical device in the second storage array. For example, consider a logical device R1 on the first storage array and a logical device R2 on the second storage array. With the SRDF/metro configuration, R1 can be paired with R2 such that R2 takes on the identity of R1 and is read/write accessible to a container.

Figure 3:
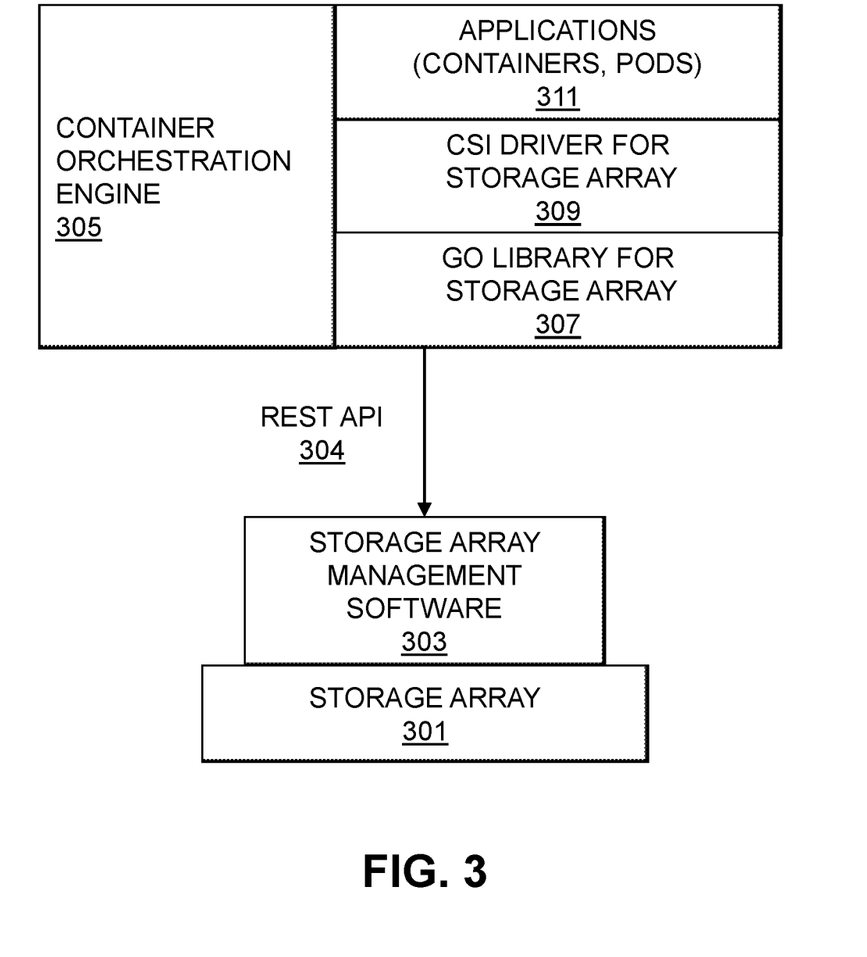
FIG. 3 shows a software stack for container orchestration with a container storage interface driver in an illustrative embodiment.

The container storage interface (CSI) is a common specification for developing drivers and plugins for container orchestrators (e.g., Kubernetes, OpenShift, etc.). Vendors may publish CSI drivers for various storage arrays. For example, Dell EMC has published CSI drivers for various storage arrays, including a CSI driver for PowerMax storage arrays. FIG. 3 illustrates a software stack for a storage array 301. The storage array 301 is associated with storage array management software 303, that is accessible via a representational state transfer (REST) application programming interface (API) 304. The storage array 301 may comprise a PowerMax storage array, and the storage array management software 303 may comprise Unisphere for PowerMax, with the REST API 304 comprising a Unisphere for VMAX (U4V) REST API. A container orchestration engine 305 (e.g., Kubernetes) accesses the storage array management software 303 using the REST API 304. The container orchestration engine 305 is also referred to as a container orchestration system (CO), which communicates with plugins using CSI service Remote Procedure Calls (RPCs). In the FIG. 3 example, the container orchestration engine 305 utilizes a Go Library 307 (e.g., a Go Library for PowerMax) and a CSI driver 309 for the storage array 301 (e.g., a PowerMax CSI Driver) for managing applications 311, where the applications 311 may include containers, container pods, etc.

The CSI driver 309 may provide functionality for various operations, including but not limited to: Create Volume (CV); Controller Publish Volume (CPV); Node Stage Volume (NSV); Node Publish Volume (NPV); Node Unstage Volume (NUSV); Node Unpublish Volume (NUPV); Controller Unpublish Volume (CUPV); and Delete Volume (DV). The Create Volume (CV) operation is used to create a volume on the storage array 301 (e.g., a PowerMax storage array), based on specifications requested by the application via a "Storage Class" in the container orchestration engine 305 (e.g., Kubernetes). The CSI driver 309 may run on a "master" or "controller" node in the container environment (e.g., a master or controller Kubernetes node, such as the management host device 112 in FIG. 1).

The Controller Publish Volume (CPV) operation is used to publish a volume to a node (e.g., one of the host devices 102 or the management host device 112 in FIG. 1) on the container orchestration engine 305 (e.g., Kubernetes), such as via a Fibre Channel (FC) or iSCSI interface. For a PowerMax storage array, this may include creating a masking view on the PowerMax storage array using the REST API 304. The Node Stage Volume (NSV) operation is used to connect the device on the node, and the Node Publish Volume (NPV) operation is used to discover and map the volume (e.g., LUN) previously created and mapped to the node, and to mount it on a local directory inside a container. The Node Unstage Volume (NUSV), Node Unpublish Volume (NUPV), and Controller Unpublish Volume (CUPV) operations do the reverse of the Node Stage Volume (NSV), Node Publish Volume (NPV) and Controller Publish Volume (CPV) operations, respectively. The Delete Volume (DV) operation is used to delete a volume after it is no longer needed.

The "Storage Class" is a construct of the container orchestration engine 305 (e.g., Kubernetes), and contains specifications about the "class of service" for a volume. The "Storage Class" specification for the PowerMax CSI driver, for example, may contain attributes such as an array identifier (ID), storage pool, service level (e.g., platinum, gold, silver, etc.), etc. The CSI driver 309 uses these attributes to decide where to create the volume, and what attributes to set for the volume.

A persistent volume provisioned by the CSI driver 309 lives on only one storage array (e.g., storage array 301). As such, if the storage array 301 becomes unavailable for some reason, the application running inside the container will experience data unavailability. There is thus a need for mechanisms that provide high availability of data for applications running in containers. In illustrative embodiments, Persistent Volume Claim (PVC) high availability is implemented using SRDF/Metro remote replication functionality in a container orchestration engine 305 (e.g., Kubernetes) single cluster environment by re-using a CSI interface of the CSI driver 309. The Create Volume (CV) operation or interface of the CSI driver 309, for example, may be modified and used to create a replicated volume by adding replication related parameters in the "Storage Class." When a new PVC creation is initiated, the Create Volume (CV) call receives these replication related parameters with SRDF/Metro configuration details to create a replicated volume. Both the remote and local volumes can then be attached to the container (or pod) using a multipath driver to provide PVC high availability.

The replication related parameters to be added to the "Storage Class" may include: SRDFMetro, which is a Boolean value where "true" represents the Metro is enabled and "false" represents that the Metro is not enabled; RDFGroup, which represents the SRDF Group number as configured on the local storage array; and RemoteSYMID, which represents the array ID of the remote storage array. In some embodiments, it is assumed that the SRDF/Metro link between the local and remote storage arrays is preconfigured, and that the Remote Data Facility (RDF) Group exists. Also, it is assumed that the node (on which the container or container pod runs) in the container environment has FC, iSCSI or other suitable connectivity to both the local and remote storage arrays. In some embodiments, it is further assumed or expected that the node will use the same protocol (e.g., FC or iSCSI) to connect to both the local and remote storage arrays.

Various CSI operations, including Create Volume (CV), Controller Publish Volume (CPV), Node Stage Volume (NSV), Node Publish Volume (NPV), Node Unpublish Volume (NUPV), Node Unstage Volume (NUSV), Controller Unpublish Volume (CUPV), and Delete Volume (DV) operations, are modified to provide a high availability of storage for containers.

The Create Volume (CV) operation is called by the container orchestration engine 305 to create a volume on behalf of a user. The CV operation call is made, for example, when a user creates a PVC in the cluster (e.g., a Kubernetes cluster). The CV call or request, besides containing provisioning related parameters such as name, capacity range, volume capabilities, etc., also contains the replication related parameters as configured in the "Storage Class." If the SRDFMetro is set to "true" the CSI driver 309 creates a volume on the local storage array and creates a replica on the remote storage array, and adds them to the specified storage group (e.g., as specified in the RDFGroup replication related parameter) on both sides (e.g., local and remote). The CSI driver 309 checks if the storage group in which the volumes belong is protected or not. If not, the CSI driver 309 protects the storage group using the RDFGroup value. A replica relationship is established between the local and remote volumes as soon as the storage group is protected. A volume context "VolumeContext" is then made for the volume, which includes the local volume and remote volume IDs, the RemoteSYMID, and the storage group name. The volume context "VolumeContext" is returned in a successful "CreateVolumeResponse" from the CSI driver 309 to the container orchestration engine 305.

The Controller Publish Volume (CPV) operation is called by the container orchestration engine 305 when a container (or pod) is scheduled on a node that has a volume mount specified. The CPV request includes volume identifier (volumeID), node identifier (nodeID), volume capabilities (VolumeCapabilities) and volume context (VolumeContext)

parameters. The CSI driver 309 recognizes that the VolumeContext in the CPV request has replication information, and thus knows that it must mask and map both the local and remote volumes to the host. The CSI driver 309 thus adds both the local and remote volumes to the respective masking view of the host on both the local and remote storage arrays. After adding the local and remote volumes to the respective masking volumes, a successful ControllerPublishVolumeResponse is returned from the CSI driver 309 to the container orchestration engine 305. The successful ControllerPublishVolumeReponse includes the LUN Address and Port Identifiers information for both the local and remote storage arrays. The LUN address and Port Identifiers information for a device is retrieved from the masking view "connections" using the local volume, local storage array and remote volume, remote storage array details, respectively. The response is referred to as "PublishContext" and is passed with the request in the node plugin operations.

The Node Stage Volume (NSV) operation is called by the container orchestration engine 305 when a container (or pod) wants to use a specified volume and is scheduled on a specified node. The NSV operation is called after the CPV operation has returned success for the specified volume on a given node. The NSV request contains volume identifier (volumeID), publish context (PublishContext), staging path (StagingPath) and volume context (VolumeContext) parameters. The CSI driver 309 will recognize that the VolumeContext has replication information, and knows that it must stage both local and remote volumes to the specified node in the StagingPath. The CSI driver 309 fetches the effective World Wide Name (WWN) for the volume, which is the same for both the local and remote volumes, as well as the LUN address, port identifiers, PublishContext and connections for both the local and remote volumes depending on the node connectivity (e.g., FC, iSCSI, etc.). A successful NodeStageVolumeResponse is then returned from the CSI driver 309 to the container orchestration engine 305.

The Node Publish Volume (NPV) operation is called by the container orchestration engine 305 when a container (or pod) wants to use a specific volume that is scheduled on a node. The NPV operation request includes volume identifier (volumeID), publish context (PublishContext), staging path (StagingPath), target path (TargetPath) and volume context (VolumeContext) parameters. The CSI driver 309 publishes the volume using the effective WWN that is present in the PublishContext parameter. Since the effective WWN is the same for both the local and remote volumes, both are published to the target path of the node. Multipath software is enabled on the node, and is used to configure multiple paths from the node to both the local and remote storage arrays. A successful NodePublishVolumeResponse is then returned from the CSI driver 309 to the container orchestration engine 305, and following this both the local and remote volumes are ready to be consumed by the container (or pod).

The Node Unpublish Volume (NUPV) operation is the reverse of the NPV operation. The container orchestration engine 305 calls the NUPV operation to unpublish each target path after the usage of the volume is finished, or if the container (or pod) is moved to another node. The NUPV request includes volume identifier (volumeID) and target path (TargetPath) parameters. The CSI driver 309 unmounts the volumes at the target path specified by the TargetPath parameter on the node. Since both the local and remote volumes had the same staging path set in the StagingPath parameter (e.g., that is used in the NPV operation), both the local and remote volumes are unpublished in the same NUPV call. A successful NodeUnpublishVolumeResponse is then returned from the CSI driver 309 to the container orchestration engine 305.

The Node Unstage Volume (NUSV) operation is the reverse of the NSV operation. The container orchestration engine 305 calls the NUSV operation once for each staging target path for a specified volume on a specified node. The NUSV operation is called after the NUPV operation returns success, and the NUSV request includes volume identifier (volumeID) and staging path parameters. The CSI driver 309 gets the remote volume and remote array ID from RDF pair information. The CSI driver 309 removes the files and directories on the staging path, and then disconnects both the local and remote volumes from the node. A successful NodeUnstageVolumeResponse is then returned from the CSI driver 309 to the container orchestration engine 305.

The Controller Unpublish Volume (CUPV) operation is the reverse of the CPV operation. The container orchestration engine 305 calls the CUPV operation after successful NUSV and NUPV operations on the volumes. The CUPV request includes volume identifier (volumeID) and node identifier (nodeID) parameters. The CSI driver 309 gets the remote volume and remote array ID from the RDF pair information. The CSI driver 309 removes both the local and remote volumes from their respective masking views and storage groups for the node specified in the nodeID parameter. Once the removal is completed, a successful ControllerUnpublishVolumeResponse is returned from the CSI driver 309 to the container orchestration engine 305.

The Delete Volume (DV) operation is the reverse of the CV operation. The container orchestration engine 305 calls the DV operation to de-provision a volume. The DV request includes a volume identifier (volumeID) parameter. The CSI driver 309 gets the remote volume and remote array ID from the RDF pair information. The CSI driver 309 performs a suspend action on the RDF group, deletes the ReplicaPair and does a Resume operation on the RDF group. The CSI driver 309 then deletes both the local and remote volumes from the respective local and remote storage arrays, and returns a response to the container orchestration engine 305.

Figure 4A:
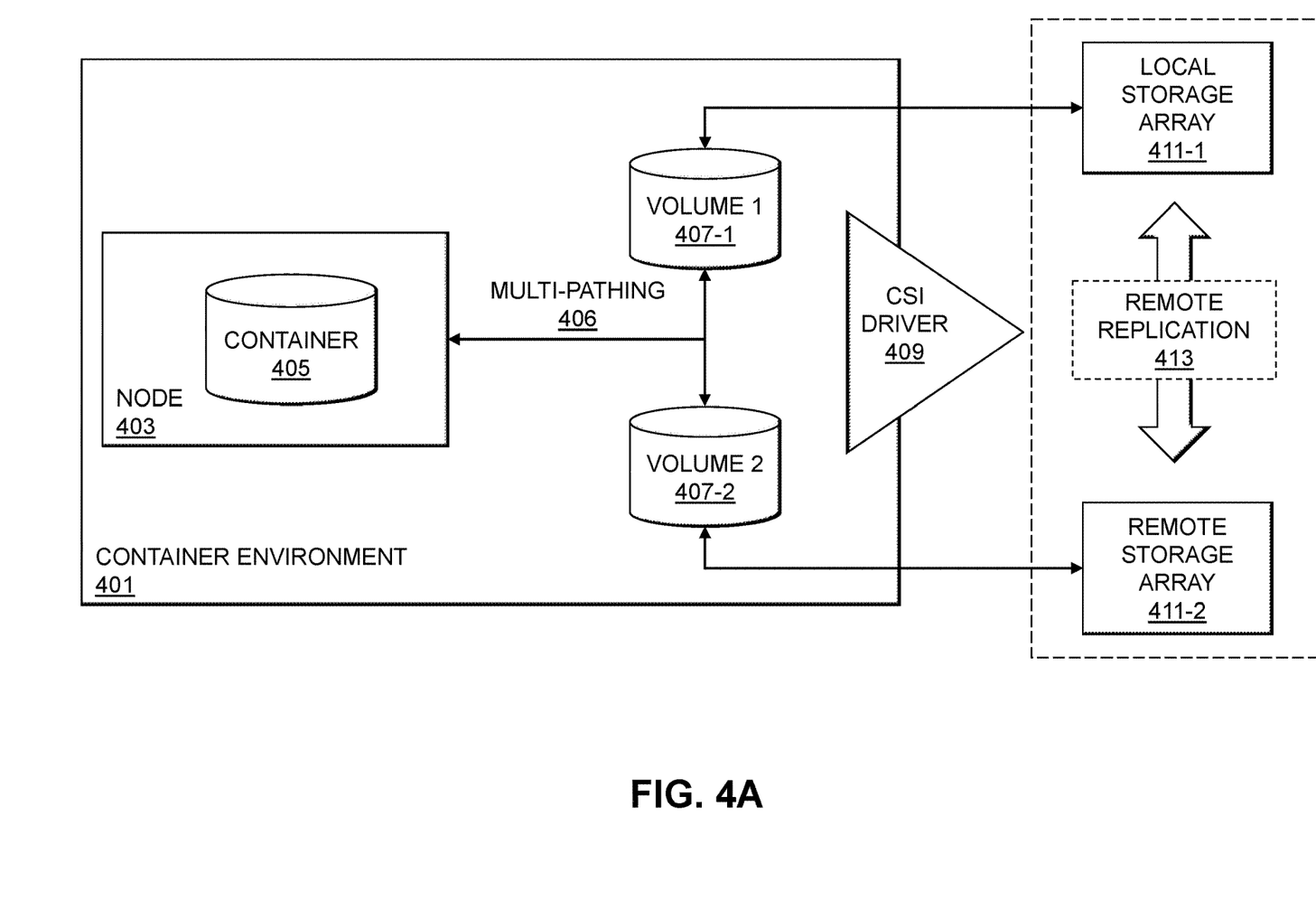
FIGS. 4A and 4B show a container environment with high availability for storage using remote replication functionality in an illustrative embodiment.
Figure 4B:
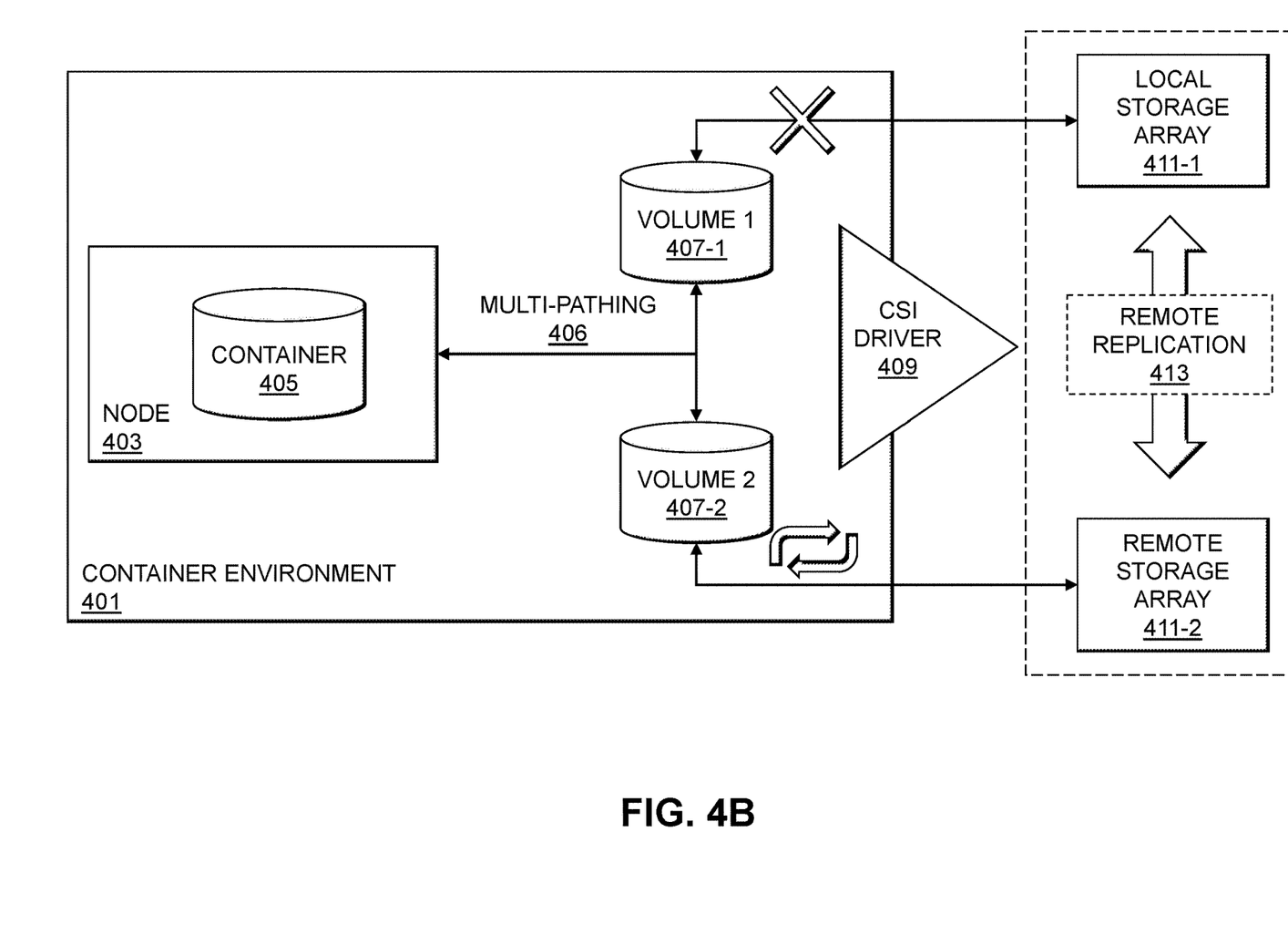

FIG. 4A shows an example implementation that uses an active-active SRDF mode operating in a container environment 401 (e.g., a Kubernetes container environment). FIG. 4A shows the container environment 401, which may be a Kubernetes cluster, having a node 403 which has connectivity to both a local storage array 411-1 (e.g., an R1 array) and a remote storage array 411-2 (e.g., an R2 array). Both the local storage array 411-1 and remote storage array 411-2 are assumed to have remote replication functionality 413 (e.g., a remote replication link) pre-configured (e.g., such as using SRDF/Metro). A container 405 (or a pod) is scheduled on the node 403, which uses both volume 1 (vol1) 407-1 and volume 2 (vol2) 407-2 for its IO operations. This vol1 is a replicated volume, and has the remote volume vol2. Multipathing software 406 is used to configure multiple 10 paths between the node 403 and the local and remote storage arrays 411-1 and 411-2 (collectively, storage arrays 411). Since FIG. 4A is configured in an active-active SRDF mode, the data is always consistent between vol1 and vol2. FIG. 4B shows the same container environment 401 as FIG. 4A, but where the link between the R1 array (e.g., local storage array 411-1) and the node 403 is down, and thus 10 operations cannot happen along that 10 path. Since the SRDF/Metro is configured, however, the IO path through the R2 array (remote storage array 411-2) is active and the 10 operations can be completed successfully through the R2 path.

As noted above, in the system of FIG. 4A it is assumed that the two storage arrays 411 (e.g., the local storage array 411-1 and remote storage array 411-2, also referred to as the R1 and R2 storage arrays) have remote replication functionality 413 (e.g., SRDF/Metro) pre-configured. There is further assumed to be a node 403 in the container environment 401 that has connections (e.g., iSCSI, FC, etc.) to both the R1 and R2 storage arrays. A PVC is requested, which uses the new "Storage Class" described herein and attaches the PVC to the container 405 (or pod) on the node 403. The CSI driver 409 is used to perform the CV, CPV, NSV and NPV operations as described above, which are all assumed to return success. On the node 403, a multipath command (e.g., multipath-1) is run, and there are multiple paths to the volume. For example, there may be four paths to the volume (e.g., two paths from the R1 storage array and two paths from the R2 storage array). Data may be written to a file and saved in the container 405.

To mock an actual link failure on R1 as shown in FIG. 4B, the connection or interface (e.g., iSCSI, FC, etc.) of the R1 storage array is disabled, and the multipath command (e.g., multipath-1) is again run on the node 403 and a failed status is observed on the paths to the R1 storage array. More data is then written in the same file and again saved in the container 405. Due to the remote replication functionality 413, such data is able to be written to the file and read from the file even with the R1 storage array link failure, showing that the IO operations can successfully run through the R2 storage array path (e.g., SRDF/Metro high availability is achieved for the container 405 on the node 403). The R1 storage array interface (e.g., iSCSI, FC, etc.) may then be re-enabled to restore the R1 storage array path to the volume, after which all the paths returned using the multipath command again have an active status.

Advantageously, the techniques described herein enable CSI drivers having SRDF/Metro or other remote replication configurations to use the new "Storage Class" implementation to achieve high availability for storage in container environments. Such high availability for storage in container environments enables end-users to avoid loss of service, protects from downtime, increases flexibility, and improves resilience and agility.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for creating high availability storage volumes for software containers will now be described in greater detail with reference to FIGS. 5 and 6. Although described in the context of system 100, these platforms may also be used to implement at least portions of other information processing systems in other embodiments.

Figure 5:
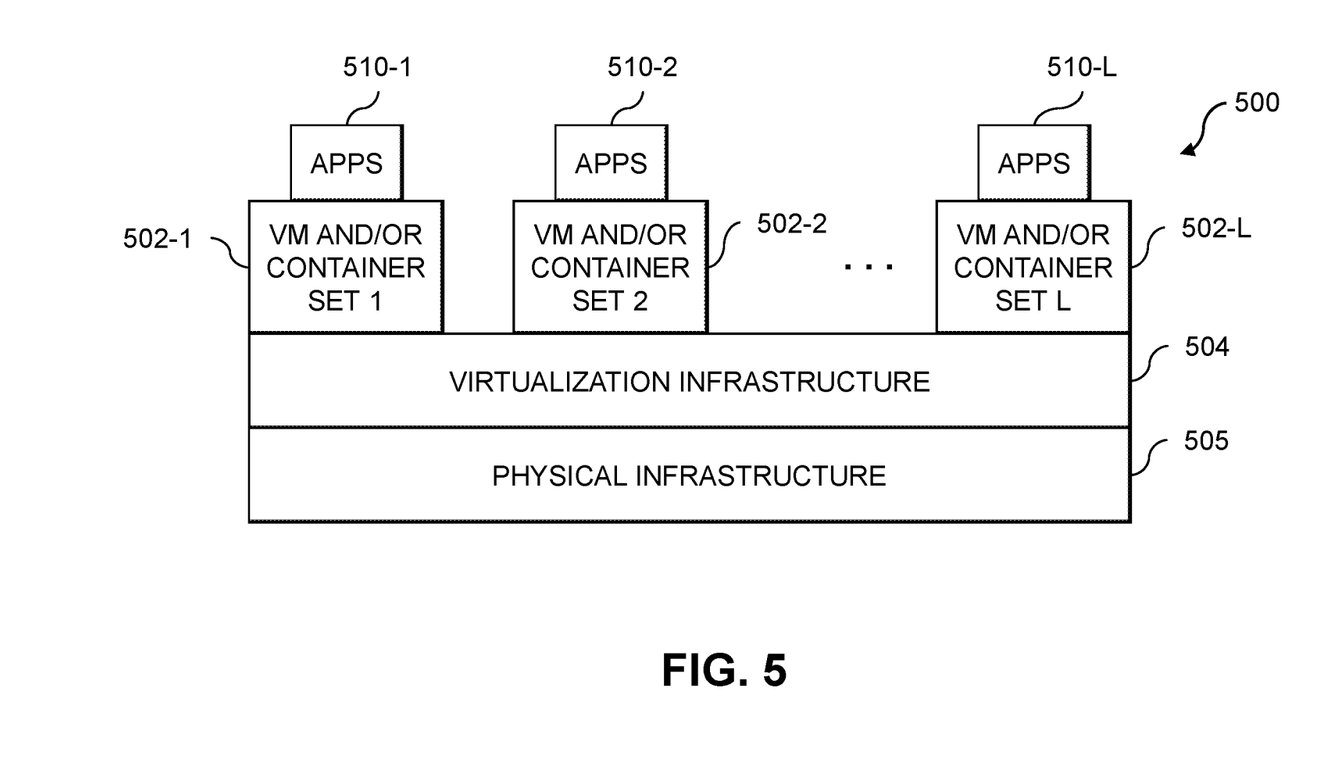
FIGS. 5 and 6 show examples of processing platforms that may be utilized to implement at least a portion of an information processing system in illustrative embodiments.
Figure 6:
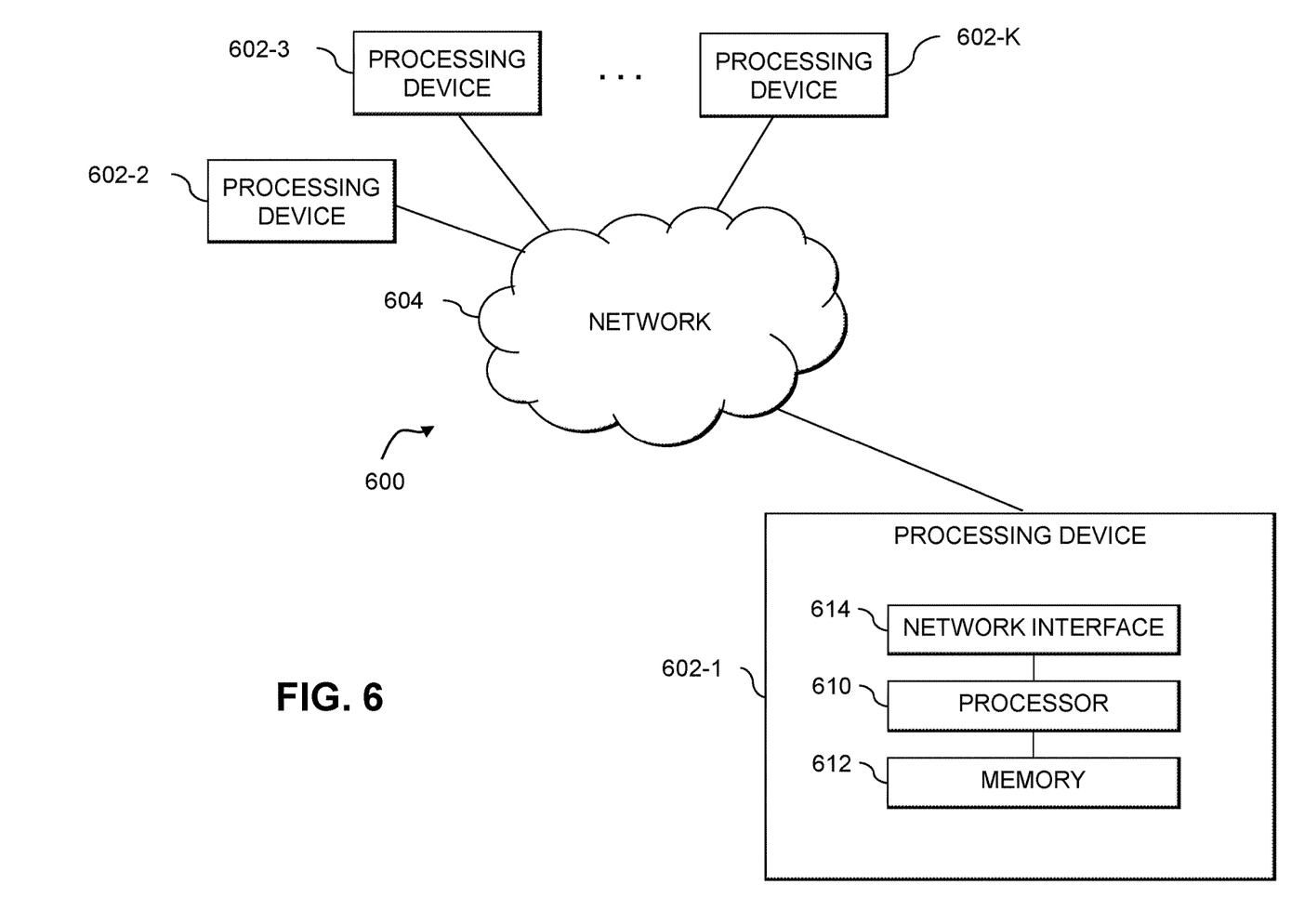

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for creating high availability storage volumes for software containers as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, container orchestrators, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   receiving a create volume request to create a given storage volume for a software container instance running on a container host device;
   parsing the given request to identify one or more replication-related parameters for the given storage volume, the identified one or more replication-related parameters comprising an availability parameter specifying whether the given storage volume should be configured with enhanced availability;
   responsive to the availability parameter specifying that the given storage volume should be configured with enhanced availability, creating a first logical storage volume on a first storage array and at least a second logical storage volume on a second storage array;
   establishing a replication link between the first logical storage volume on the first storage array and the second logical storage volume on the second storage array; and
   mounting the first logical storage volume and the second logical storage volume to a designated volume mount point in the software container instance;
   wherein mounting the first logical storage volume and the second logical storage volume to the designated volume mount point in the software container instance comprises:
      identifying a target path for the given storage volume;
      associating the first storage volume and the second storage volume with the identified target path for the given storage volume; and
      utilizing input-output multipathing functionality on the container host device to configure (i) one or more first input-output paths from the software container instance on the container host device to the first logical storage volume on the first storage array and (ii) one or more second input-output paths from the software container instance on the container host device to the second logical storage volume on the second storage array; and
   wherein the method is performed by at least one processing device comprising a processor coupled to a memory.

2. The method of claim 1 wherein the one or more replication-related parameters are included in a storage class specified in the create volume request, the storage class specifying a set of attributes that determine a class of service for the given storage volume.

3. The method of claim 1 wherein the one or more replication-related parameters further comprises a replication group number, the replication group number identifying a first set of ports on the first storage array and a second set of ports on the second storage array to be used for establishing the replication link between the first logical storage volume on the first storage array and the second logical storage volume on the second storage array.

4. A computer program product comprising a non-transitory processor-readable storage medium having stored therein program code of one or more software programs, wherein the program code when executed by at least one processing device causes the at least one processing device to perform steps of:
   receiving a create volume request to create a given storage volume for a software container instance running on a container host device;
   parsing the given request to identify one or more replication-related parameters for the given storage volume, the identified one or more replication-related parameters comprising an availability parameter specifying whether the given storage volume should be configured with enhanced availability;
   responsive to the availability parameter specifying that the given storage volume should be configured with enhanced availability, creating a first logical storage volume on a first storage array and at least a second logical storage volume on a second storage array;

establishing a replication link between the first logical storage volume on the first storage array and the second logical storage volume on the second storage array; and mounting the first logical storage volume and the second logical storage volume to a designated volume mount point in the software container instance;

wherein mounting the first logical storage volume and the second logical storage volume to the designated volume mount point in the software container instance comprises:

identifying a target path for the given storage volume;

associating the first storage volume and the second storage volume with the identified target path for the given storage volume; and utilizing input-output multipathing functionality on the container host device to configure (i) one or more first input-output paths from the software container instance on the container host device to the first logical storage volume on the first storage array and (ii) one or more second input-output paths from the software container instance on the container host device to the second logical storage volume on the second storage array.

5. The computer program product of claim 4 wherein the one or more replication-related parameters are included in a storage class specified in the create volume request, the storage class specifying a set of attributes that determine a class of service for the given storage volume.

6. The computer program product of claim 4 wherein the one or more replication-related parameters further comprises a replication group number, the replication group number identifying a first set of ports on the first storage array and a second set of ports on the second storage array to be used for establishing the replication link between the first logical storage volume on the first storage array and the second logical storage volume on the second storage array.

7. An apparatus comprising:
at least one processing device comprising a processor coupled to a memory;
the at least one processing device being configured to perform steps of:
receiving a create volume request to create a given storage volume for a software container instance running on a container host device;
parsing the given request to identify one or more replication-related parameters for the given storage volume, the identified one or more replication-related parameters comprising an availability parameter specifying whether the given storage volume should be configured with enhanced availability;
responsive to the availability parameter specifying that the given storage volume should be configured with enhanced availability, creating a first logical storage volume on a first storage array and at least a second logical storage volume on a second storage array;
establishing a replication link between the first logical storage volume on the first storage array and the second logical storage volume on the second storage array; and
mounting the first logical storage volume and the second logical storage volume to a designated volume mount point in the software container instance;
wherein mounting the first logical storage volume and the second logical storage volume to the designated volume mount point in the software container instance comprises:
identifying a target path for the given storage volume;

associating the first storage volume and the second storage volume with the identified target path for the given storage volume; and utilizing input-output multipathing functionality on the container host device to configure (i) one or more first input-output paths from the software container instance on the container host device to the first logical storage volume on the first storage array and (ii) one or more second input-output paths from the software container instance on the container host device to the second logical storage volume on the second storage array.

8. The apparatus of claim 7 wherein the at least one processing device implements at least one container storage interface driver for a container orchestration engine that manages a plurality of container host devices including the container host device, the container storage interface driver being configured to perform the receiving, parsing, creating, establishing and mounting steps.

9. The apparatus of claim 7 wherein the one or more replication-related parameters are included in a storage class specified in the create volume request, the storage class specifying a set of attributes that determine a class of service for the given storage volume.

10. The apparatus of claim 7 wherein the one or more replication-related parameters further comprises a replication group number, the replication group number identifying a first set of ports on the first storage array and a second set of ports on the second storage array to be used for establishing the replication link between the first logical storage volume on the first storage array and the second logical storage volume on the second storage array.

11. The apparatus of claim 7 wherein the one or more replication-related parameters further comprises an array identifier of the second storage array.

12. The apparatus of claim 7 wherein the at least one processing device is configured to return a volume context for the given storage volume, the volume context comprising a first logical storage volume identifier for the first logical storage volume, a second logical storage volume identifier for the second logical storage volume, a storage group name and the array identifier of the second storage array.

13. The apparatus of claim 7 wherein mounting the first logical storage volume and the second logical storage volume to the designated volume mount point in the software container instance specified in the given request comprises:
receiving, responsive to the software container instance being scheduled on the container host device having the designated volume mount point specifying the given storage volume, a controller publish request comprising a volume context for the given storage volume;
adding the first logical storage volume and the second logical storage volume identified in the volume context to a masking view of the container host device on the first storage array and the second storage array; and
generating a publish context for the given storage volume, the publish context comprising logical unit addresses and port identifiers for the first logical storage volume on the first storage array and the second logical storage volume on the second storage array.

14. The apparatus of claim 7 wherein mounting the first logical storage volume and the second logical storage volume to the designated volume mount point in the software container instance specified in the given request further comprises:

receiving, responsive to the software container instance requesting to utilize the given storage volume on the container host device, a node stage volume request comprising a publish context for the given storage volume and a staging path for the container host device;

adding the first logical storage volume on the first storage array and the second logical storage volume on the second storage array to the staging path; and utilizing logical unit address and port identifier information in the publish context to connect the container host device to the first logical storage volume on the first storage array and the second logical storage volume on the second storage array.

15. The apparatus of claim 7 wherein mounting the first logical storage volume and the second logical storage volume to the designated volume mount point in the software container instance specified in the given request further comprises receiving, responsive to the software container instance requesting to utilize the given storage volume on the container host device, a node publish volume request, the node publish volume request specifying the target path for the given storage volume.

16. The apparatus of claim 7 wherein the at least one processing device is further configured to perform the step of unmounting the first logical storage volume and the second logical storage volume from the designated volume mount point in the software container instance.

17. The apparatus of claim 16 wherein unmounting the first logical storage volume and the second logical storage volume from the designated volume mount point in the software container instance comprises:

receiving, responsive to determining that at least one of usage of the given storage volume on the container host device is completed and that the software container instance is to be moved to another container host device, a node unpublish volume request specifying the given storage volume and the target path for the given storage volume; and unmounting the first logical storage volume and the second logical storage volume from the target path for the given storage volume on the container host device.

18. The apparatus of claim 16 wherein unmounting the first logical storage volume and the second logical storage volume from the designated volume mount point in the software container instance comprises:

receiving, responsive to unmounting the first logical storage volume and the second logical storage volume from a target path for the given storage volume on the container host device, a node unstage volume request specifying the given storage volume and a staging path on the container host device;

removing one or more files and directories in the staging path; and disconnecting the container host device from the first logical storage volume on the first storage array and the second logical storage volume on the second storage array.

19. The apparatus of claim 16 wherein unmounting the first logical storage volume and the second logical storage volume from the designated volume mount point in the software container instance comprises:

receiving, responsive to unmounting the first logical storage volume and the second logical storage volume from a target path for the given storage volume on the container host device and disconnecting the container host device from the given storage volume, a controller unpublish volume request specifying the given storage volume and the container host device; and removing the first logical storage volume and the second logical storage volume from a masking view of the container host device on the first storage array and the second storage array.

20. The apparatus of claim 16 wherein unmounting the first logical storage volume and the second logical storage volume from the designated volume mount point in the software container instance comprises:

receiving a request to delete the given storage volume;

performing a suspend action for a replication group associated with the given storage volume;

deleting a replica pair in the replication group, the replica pair comprising the first logical storage volume and the second logical storage volume;

performing a resume action for the replication group; and deleting the first logical storage volume from the first storage array and the second logical storage volume from the second storage array.

* * * * *